Feb. 10, 1959    R. H. CATHA    2,872,910
VARIABLE TIMING GEAR FOR INTERNAL COMBUSTION ENGINES
Filed April 18, 1958    2 Sheets-Sheet 1
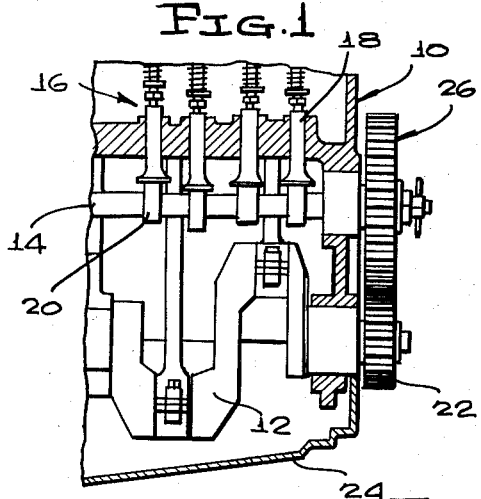
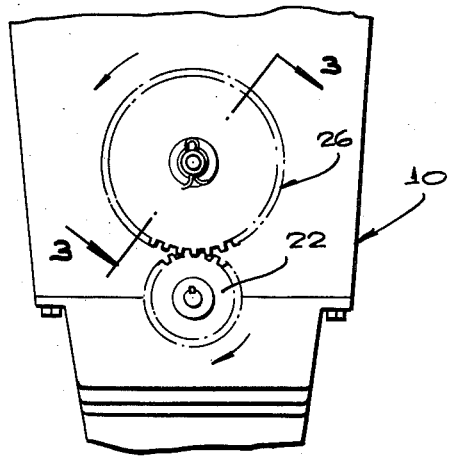
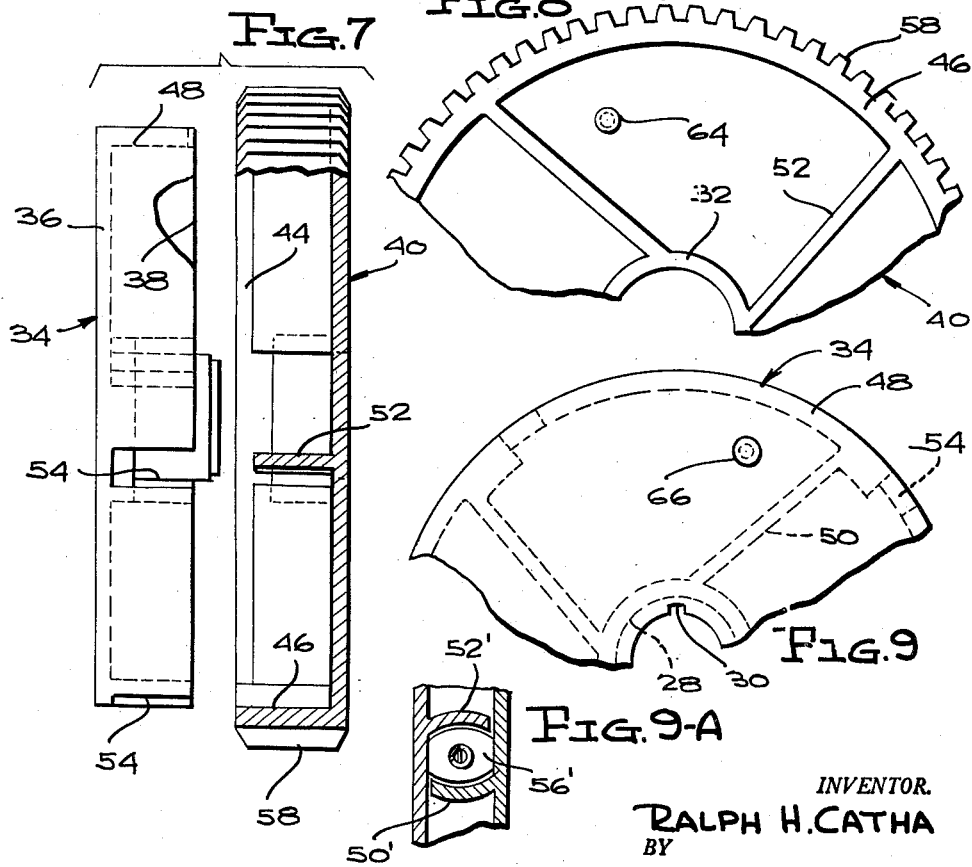
INVENTOR.
RALPH H. CATHA
BY
McMorrow, Berman + Davidson
ATTORNEYS Feb. 10, 1959  R. H. CATHA  2,872,910
VARIABLE TIMING GEAR FOR INTERNAL COMBUSTION ENGINES
Filed April 18, 1958  2 Sheets-Sheet 2
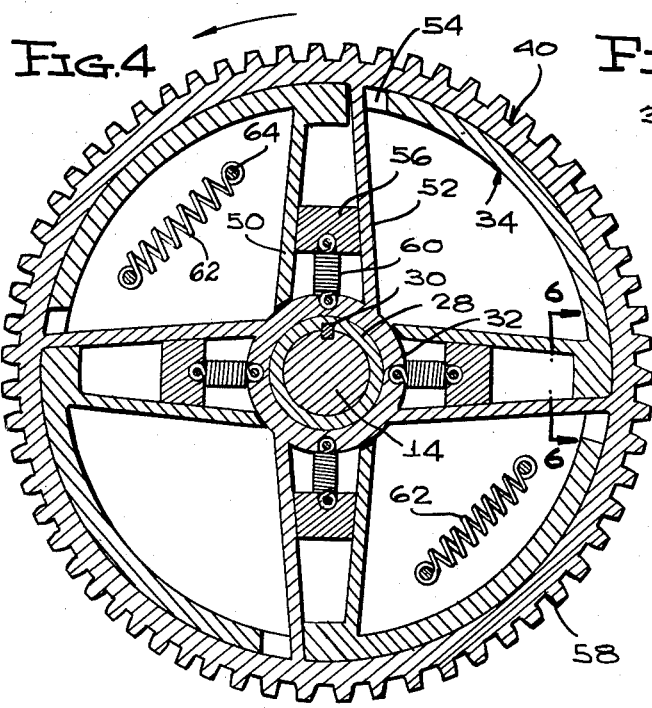
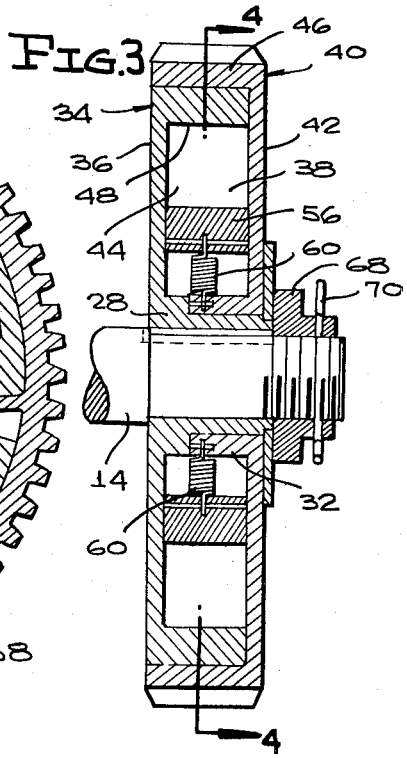
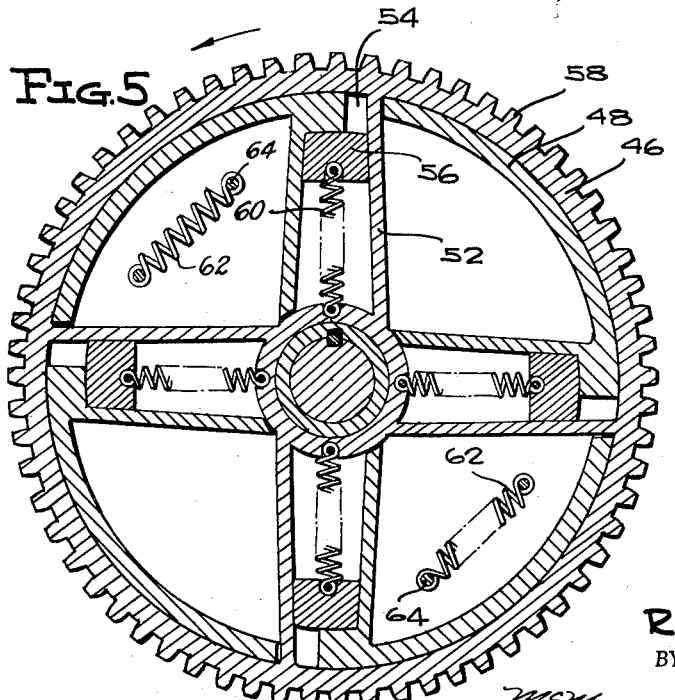
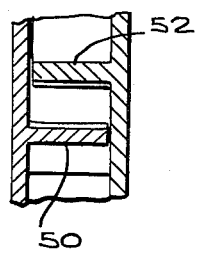
INVENTOR.
RALPH H. CATHA
BY
*McMorrow, Berman & Davidson*
ATTORNEYS

United States Patent Office 2,872,910
Patented Feb. 10, 1959

2,872,910

VARIABLE TIMING GEAR FOR INTERNAL COMBUSTION ENGINES

Ralph H. Catha, Birmingham, Ala.

Application April 18, 1958, Serial No. 729,410

5 Claims. (Cl. 123—90)

The present invention relates to internal combustion engines generally and in particular to a variable timing gear for such engines.

An object of the present invention is to provide a timing gear for an internal combustion engine which lends itself to automatic timing of the valve system of the engine and providing efficient operation and optimum hosepower output at all engine speeds throughout the range of engine speed.

Another object of the present invention is to provide a timing gear for an internal combustion engine which automatically advances the opening of the valves of the engine when the engine is running at high speed and automatically retards the opening of the valves when the engine is running at low speed.

A further object of the present invention is to provide a variable timing gear for an internal combustion engine which is readily and easily installed in any combustion engine replacing the presently used timing gear therein.

A still further object of the present invention is to provide a variable timing gear for an internal combustion engine which is simple in structure, one sturdy in construction and having few parts, and one which is economical to manufacture and assemble.

These and other objects and advantages of the present invention will be fully apparent from the following description when taken in conjunction with the annexed drawings, in which:

Figure 1 is a sectional view of a portion of an internal combustion engine showing the cam shaft, crank shaft and the timing gears connecting the same together;

Figure 2 is an end view of the assembly shown in Figure 1;

Figure 3 is a sectional view, on an enlarged scale, taken on the line 3—3 of Figure 2;

Figure 4 is a view taken on the line 4—4 of Figure 3, showing the timing gear of the present invention in the valve opening retarded position;

Figure 5 is a view similar to Figure 4, showing the timing gear in the valve opening advanced position;

Figure 6 is a view taken on the line 6—6 of Figure 4;

Figure 7 is an exploded view of the components of the timing gear of the present invention;

Figure 8 is a fragmentary elevational view of a portion of the outer drum of the timing gear;

Figure 9 is a fragmentary elevational view of the timing gear inner drum; and

Figure 9a is a sectional view of the ribs and wedge, according to a modified form of the present invention.

Referring in greater detail to the drawings in which like numerals indicate like parts throughout the several views, in Figure 1 the reference numeral 10 designates a portion of an internal combustion engine having crankshaft 12, a cam shaft 14, and a valve assembly 16 including tappets 18 riding upon the lobes 20 of the cam shaft 14.

A timing gear 22 is fixedly secured to the projecting end portion of the crankshaft 12 exteriorly of the crank case 24. The timing gear of the present invention is designated generally by the reference numeral 26 and is shown operatively connected to the projecting end portion of the cam shaft 14 adjacent the timing gear 22.

The timing gear 26 consists in a hub 28 fixedly secured by means of a key 30 to the projecting end portion of the cam shaft 14, as shown in Figures 4 and 5. A sleeve 32 is circumposed about the hub 28 and is slidable thereon. A first drum 34 having a closed end 36 and an open end 38 is fixedly secured to, or formed integrally with, the hub 28.

A second drum 40, also having a closed end 42 and an open end 44 is positioned so that the periphery 46 thereof is circumposed about the periphery 48 of the drum 34 and is slidable therearound for limited rotary movement relative to the first drum 34. The drums are positioned so that the open end 38 of the drum 34 is in abutting engagement with the inner face of the closed end 42 of the second or outer drum 40 and the open end 44 of the drum 40 is in abutting engagement with the inner face of the closed end 36 of the drum 34, as shown in Figure 3.

The first drum 34 is provided with a plurality of spaced ribs 50 projecting perpendicularly from the closed end thereof and arranged in substantial radial relation, each rib 50 having its outer end formed integrally with the periphery 48 of the drum 34.

As shown in Figure 3, the hub 28 is stepped with the sleeve 32 circumposed about the reduced portion of the hub 28. Each rib 50 extends from the periphery 48 of the drum 34 to the enlarged portion of the hub 28.

Another plurality of ribs 52 project perpendicularly from the inner face of the closed end 42 of the drum 40 and extend from the periphery 46 of the drum 40 to the sleeve 32. The ribs 52 are also arranged substantially radially between the sleeve and periphery of the drum 40. Each rib 52 is arranged in confronting spaced face to face relation with respect to one rib 50 with the outer ends of the ribs 50 and 52 converging toward each other, as shown most clearly in Figure 4.

The periphery 48 of the inner drum 34 is provided with an opening 54 positioned adjacent to and spaced from the confronting face of each rib 50. The adjacent portion of the adjacent outer drum rib 52 extends through the adjacent opening 54 and is loosely movable from one side of the opening 54 to the other so that the periphery 46 of the outer drum 40 is relatively movable with respect to the periphery 48 of the inner drum 34.

A weight or wedge 56 is positioned between the confronting faces of each pair of ribs 50 and 52 and is projectable toward and retractable away from the sleeve 32. Each wedge 56 has its abutting faces conformably tapered to fit the converging ribs 50 and 52 and is responsive to increase the speed of the outer drum 40, resulting in centrifugal force projecting the wedges or weights 56 outwardly from the sleeve 32 toward the peripheries of the drums and to drive the rib 52 away from the associated rib 50. This effects the movement of the portion of the rib 52 which extends into the opening 54 to move from one side of the opening 54 toward the other side and to thereby advance the drum 34 relative to the drum 40 when the cam shaft 14 rotates in the direction shown by the arrow in Figures 4 and 5.

Gear teeth 58 extend about the outer periphery of the drum 40 and are in meshing engagement with the teeth on the timing gear 22.

Spring means is provided connecting each wedge 56 to the adjacent portion of the sleeve 32 for urging the wedge 56 toward the sleeve 32. This means consists in a coil spring 60 having one end fixedly secured to each wedge 56 and having its other end fixedly secured to the adjacent portion of the sleeve 32.

Spring means is provided connecting the drums 34 and 40 together for urging the drum 34 to the valve opening retarded position. Specifically, this consists in another coil spring 62 positioned in at least one of the spaces between adjacent pairs of ribs 50 and 52 and having one end fixedly secured to a projection on the inner face of the closed end 42 of the drum 40 and the other end fixedly secured to a projection on the closed end 36 of the drum 34. The aforesaid projections are shown in Figures 8 and 9 and are designated respectively by the numerals 64 and 66.

Conventional means such as a castellated nut 68 and a cotter pin 70 are used to maintain the timing gear of the present invention on the end portion of the cam shaft 14.

In operation, with the cam shaft 14 being driven at a low rate of speed by engagement of the teeth on the timing gear 22 with the teeth 58 on the outer periphery of the outer drum 40, the wedges 56 will be maintained in their position toward the sleeve 32 by the action of the coil spring 60. Upon increase in speed of rotation of the timing gear 26, the wedges 56 will be driven outwardly from the sleeve 32 toward the peripheries of the drum, shifting the ribs 52 away from the associated ribs 50 and advancing the cam shaft relative to the teeth 58 of the outer drum 40. This results in advancing the opening of the valves in the valve assembly 16 for more efficient operation of the engine at high speeds. Upon slowing of the speed of rotation of the crank shaft 12 and the associated timing gear 22, the wedges 56 will return toward the sleeve 28 and the coil spring 62 will shift the inner drum 34 so that the ribs 50 and 52 return to their positions with the ribs 52 on the near side of the openings 54, thus retarding the opening of the valves in the valve assembly 16 for efficient operation at low speeds.

In Figure 9a, the ribs 50' and 52' are concave on their confronting faces and the wedge 56' has convex matching surfaces engaging the confronting rib faces, in a modified form of the present invention.

What is claimed is:

1. In an internal combustion engine including a crankshaft having a timing gear on one end thereof, and a valve actuating rotatable cam shaft, the improvement consisting in variable valve timing means connecting said gear to said cam shaft, said means comprising a hub fixedly secured to one end of said cam shaft, a sleeve circumposed about said hub and slidable thereon, a first drum having one end open and the other end closed carried by said hub, a second drum having one end open and the other end closed positioned so that the periphery thereof is circumposed about the periphery of said first drum with the open end of said first drum within said second drum and in abutting engagement with the closed end of said second drum, a rib projecting perpendicularly from the inner face of the closed end of said first drum and extending from said hub to the periphery of said first drum, there being an opening in the periphery of said first drum adjacent to and spaced from said rib, another rib projecting perpendicularly from the inner face of the closed end of said second drum and having a portion adjacent one end extending loosely through said opening, said ribs being in face to face spaced relation and having the ends adjacent the peripheries of said first and second drums converging toward each other, and a wedge positioned between and slidably engaging the confronting faces of said ribs, said wedge being movable outwardly of said sleeve responsive to centrifugal force when said cam shaft is rotated and operable to shift said another rib away from said first-named rib, and teeth extending about the outer periphery of said second drum in meshing engagement with said timing gear.

2. In an internal combustion engine including a crankshaft having a timing gear on one end thereof, and a valve actuating rotatable cam shaft, the improvement consisting in variable valve timing means connecting said gear to said cam shaft, said means comprising a hub fixedly secured to one end of said cam shaft, a sleeve circumposed about said hub and slidable thereon, a first drum having one end open and the other end closed carried by said hub, a second drum having one end open and the other end closed positioned so that the periphery thereof is circumposed about the periphery of said first drum with the open end of said first drum within said second drum and in abutting engagement with the closed end of said second drum, a rib projecting perpendicularly from the inner face of the closed end of said first drum and extending from said hub to the periphery of said first drum, there being an opening in the periphery of said first drum adjacent to and spaced from said rib, another rib projecting perpendicularly from the inner face of the closed end of said second drum and having a portion adjacent one end extending loosely through said opening, said ribs being in face to face spaced relation and having the ends adjacent the peripheries of said first and second drums converging toward each other, and a wedge positioned between and slidably engaging the confronting faces of said ribs, said wedge being movable outwardly of said sleeve responsive to centrifugal force when said cam shaft is rotated and operable to shift said another rib away from said first-named rib, teeth extending about the outer periphery of said second drum in meshing engagement with said timing gear, and spring means operatively connected to said sleeve and to said wedge for urging the latter toward said sleeve.

3. In an internal combustion engine including a crankshaft having a timing gear on one end thereof, and a valve actuating rotatable cam shaft, the improvement consisting in variable valve timing means connecting said gear to said cam shaft, said means comprising a hub fixedly secured to one end of said cam shaft, a sleeve circumposed about said hub and slidable thereon, a first drum having one end open and the other end closed carried by said hub, a second drum having one end open and the other end closed positioned so that the periphery thereof is circumposed about the periphery of said first drum with the open end of said first drum within said second drum and in abutting engagement with the closed end of said second drum, a rib projecting perpendicularly from the inner face of the closed end of said first drum and extending from said hub to the periphery of said first drum, there being an opening in the periphery of said first drum adjacent to and spaced from said rib, another rib projecting perpendicularly from the inner face of the closed end of said second drum and having a portion adjacent one end extending loosely through said opening, said ribs being in face to face spaced relation and having the ends adjacent the peripheries of said first and second drums converging toward each other, and a wedge positioned between and slidably engaging the confronting faces of said ribs, said wedge being movable outwardly of said sleeve responsive to centrifugal force when said cam shaft is rotated and operable to shift said another rib away from said first-named rib, teeth extending about the outer periphery of said second drum in meshing engagement with said timing gear, spring means operatively connected to said sleeve and to said wedge for urging the latter toward said sleeve, and other spring means operatively connecting said first and second drums for urging said another rib toward said first-named rib.

4. In an internal combustion engine including a crank shaft having a timing gear on one end thereof, and a valve actuating rotatable cam shaft, the improvement consisting in variable valve timing means connecting said gear to said shaft, said means comprising a toothed outer drum in meshing engagement with said timing gear, an inner drum carried by said cam shaft and encompassed by said outer drum, and means connecting said inner drum to said outer drum so that said inner drum is movable relative to said outer drum responsive to increase of speed of said outer drum.

5. In an internal combustion engine including a crank shaft having a timing gear on one end thereof, and a valve actuating rotatable cam shaft, the improvement consisting in variable valve timing means connecting said gear to said shaft, said means comprising a toothed outer drum in meshing engagement with said timing gear, an inner drum carried by said cam shaft and encompassed by said outer drum, and means embodying a plurality of projectable and retractable weights operatively connected to said outer drum so that said inner drum is movable relative to the outer drum responsive to increase in speed of said outer drum.

References Cited in the file of this patent

UNITED STATES PATENTS

| | | |
|---|---|---|
| 953,424 | Lindsay | Mar. 29, 1910 |
| 1,282,571 | Guay | Oct. 22, 1918 |
| 2,120,612 | Isakson | June 14, 1938 |
| 2,307,926 | Griffith et al. | Jan. 12, 1943 |